(12) United States Patent
Liu (10) Patent No.: US 9,795,166 B2
(45) Date of Patent: Oct. 24, 2017

(54) ELECTRONIC CIGARETTE DEVICE

(71) Applicant: KIMREE HI-TECH INC., Tortola (VG)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 0 days.

(21) Appl. No.: 14/361,407

(22) PCT Filed: Dec. 18, 2013

(86) PCT No.: PCT/CN2013/089781
§ 371 (c)(1),
(2) Date: May 29, 2014

(87) PCT Pub. No.: WO2015/078067
PCT Pub. Date: Jun. 4, 2015

(65) Prior Publication Data
US 2016/0353798 A1 Dec. 8, 2016

(30) Foreign Application Priority Data

Nov. 29, 2013 (CN) .................. 2013 2 0775496 U (51) Int. Cl.
*A61M 15/06* (2006.01)
*A24F 47/00* (2006.01)
*F16B 7/20* (2006.01)

(52) U.S. Cl.
CPC .............. *A24F 47/008* (2013.01); *F16B 7/20* (2013.01)

(58) Field of Classification Search
None
See application file for complete search history.

(56) References Cited

U.S. PATENT DOCUMENTS 796,306 A * 8/1905 Exley .................... F16L 13/141
285/330
1,307,273 A * 6/1919 Salley .................. F16L 37/248
285/258

(Continued)

FOREIGN PATENT DOCUMENTS

CN 102406238 A 4/2012
CN 202907798 U 5/2013

(Continued)

OTHER PUBLICATIONS

International Search Report relating to Application No. PCT/CN2013/089781; dated Dec. 18, 2013; no English translation available.

*Primary Examiner* — Thor Campbell
(74) *Attorney, Agent, or Firm* — Yue Xu; U.S. Fairsky LLP (57) ABSTRACT

An electronic cigarette device includes an atomizer and a battery rod, a retaining member is provided on an outer peripheral surface of one end of the atomizer, and an engaging groove is provided on an end surface of one end of the battery rod and configured to accommodate one end of the atomizer, a side wall of the engaging groove is provided with a guide groove extending in a radial direction of the batter rod, a directing groove extending along a circumferential direction of the battery rod and in communication with the guide groove, and a retaining groove for accommodating the retaining member and extending from one end, away from the guide groove, of the directing groove towards the end surface of the battery rod, and a stopper is formed between the guide groove and the retaining groove to prevent the retaining member from moving towards the guide groove.

9 Claims, 6 Drawing Sheets

(56) References Cited

U.S. PATENT DOCUMENTS

| | | | | |
|---|---|---|---|---|
| 1,885,321 A * | 11/1932 | Benn | F16L 37/248 | 285/331 |
| 1,890,011 A * | 12/1932 | Wirz | F16L 37/248 | 285/376 |
| 2,421,228 A * | 5/1947 | White | F16L 37/248 | 285/110 |
| 2,876,410 A * | 3/1959 | Fry | H01M 2/1044 | 219/240 |
| 4,340,269 A * | 7/1982 | McGeary | H01R 24/40 | 439/314 |
| 4,632,433 A * | 12/1986 | Kimura | F16L 37/107 | 285/281 |
| 4,909,545 A * | 3/1990 | Hohol | F16L 37/248 | 285/148.13 |
| 5,536,174 A * | 7/1996 | Forish | B60Q 1/2607 | 439/57 |
| 5,875,976 A * | 3/1999 | Nelson | A61M 5/30 | 239/329 |
| 6,361,687 B1 * | 3/2002 | Ford | F16L 37/248 | 210/198.2 |
| 6,561,841 B2 * | 5/2003 | Norwood | H01R 13/641 | 439/286 |
| 6,808,407 B1 * | 10/2004 | Cannon | H01R 13/625 | 439/314 |
| 7,011,544 B1 * | 3/2006 | Zemba | H01R 13/625 | 439/578 |
| 7,354,289 B2 * | 4/2008 | Cannon | G01R 1/06788 | 439/314 |
| 7,452,228 B1 * | 11/2008 | Kennedy | H01R 13/622 | 439/314 |
| 8,439,593 B2 * | 5/2013 | Slater | A61F 2/4684 | 403/348 |
| 8,897,628 B2 * | 11/2014 | Conley | A24F 47/008 | 392/386 |
| 8,997,753 B2 * | 4/2015 | Li | H01C 17/00 | 128/202.21 |
| 9,320,300 B2 * | 4/2016 | Hon | A24F 47/008 | |
| 9,555,203 B2 * | 1/2017 | Terry | A24F 47/008 | |
| 2004/0082213 A1 * | 4/2004 | Felps | H01R 13/639 | 439/332 |
| 2008/0209784 A1 * | 9/2008 | Brodie | E01F 9/629 | 40/607.04 |
| 2011/0290249 A1 * | 12/2011 | Schennum | A61M 15/009 | 128/202.21 |
| 2013/0087160 A1 * | 4/2013 | Gherghe | A24F 47/008 | 131/329 |
| 2013/0192615 A1 * | 8/2013 | Tucker | H01C 17/00 | 131/328 |
| 2013/0298905 A1 * | 11/2013 | Levin | A24F 47/008 | 128/202.21 |
| 2014/0014124 A1 * | 1/2014 | Glasberg | A24F 47/008 | 131/328 |
| 2014/0014125 A1 * | 1/2014 | Fernando | A24F 47/008 | 131/328 |
| 2014/0299137 A1 * | 10/2014 | Kieckbusch | A24F 47/008 | 131/328 |
| 2014/0355969 A1 * | 12/2014 | Stern | A24F 47/008 | 392/390 |
| 2015/0053214 A1 * | 2/2015 | Alarcon | A24F 47/00 | 131/273 |
| 2015/0059779 A1 * | 3/2015 | Alarcon | A24F 47/00 | 131/273 |
| 2015/0128972 A1 * | 5/2015 | Verleur | A24F 47/008 | 131/329 |
| 2015/0128976 A1 * | 5/2015 | Verleur | A24F 47/008 | 131/329 |
| 2015/0150305 A1 * | 6/2015 | Shenkal | A24F 47/008 | 131/329 |
| 2015/0223522 A1 * | 8/2015 | Ampolini | A24F 47/008 | 131/328 |
| 2015/0224268 A1 * | 8/2015 | Henry | A24F 47/008 | 128/202.21 |
| 2015/0313288 A1 * | 11/2015 | Liu | A24F 47/008 | 131/329 |

FOREIGN PATENT DOCUMENTS

| | | |
|---|---|---|
| CN | 202919037 U | 5/2013 |
| CN | 203152490 U | 8/2013 |
| CN | 203168036 U | 9/2013 |
| CN | 203182012 U | 9/2013 |
| WO | 2013/171206 A1 | 11/2013 |

* cited by examiner

ELECTRONIC CIGARETTE DEVICE

The present application is the U.S. national phase of International Application No. PCT/CN2013/089781, titled "ELECTRONIC CIGARETTE DEVICE", filed on Dec. 18, 2013, which claims the benefit of priority to Chinese Patent Application No. 201320775496.0 titled "ELECTRONIC CIGARETTE DEVICE", filed with the Chinese State Intellectual Property Office on Nov. 29, 2013 both of which applications are incorporated herein in their entireties by this reference.

TECHNICAL FIELD

The present application relates to the technical field of simulated cigarette devices, in particular to an electronic cigarette device.

BACKGROUND

An electronic cigarette is a common electronic simulated cigarette, and higher performance for the electronic cigarette device is required as the usage requirements are continuously increased.

Currently, the existing electronic cigarette device generally includes an atomizer and a battery rod. Generally, the atomizer and the battery rod are connected in a simple plug-in connection, although the electronic cigarette device with such assembly structure meets basic usage needs, the connection between the battery rod and the atomizer may be loosened after a long-term use or when a vibration occurs in use since such simple plug-in connection has a poor reliable, and even worse, the battery rod and the atomizer may be disengaged from each other, which causes a lot of inconvenience in the normal use of the electronic cigarette device.

Therefore, a technical problem to be solved presently by those skilled in the art is to provide a more stable and reliable assembly structure between the battery rod and the atomizer of the electronic cigarette device.

SUMMARY

An object of the present application is to provide an electronic cigarette device, which has a more stable and reliable assembly structure between a battery rod and an atomizer thereof.

To solve the above problems, the present application provides an electronic cigarette device including an atomizer and a battery rod which are configured to be connected, wherein, a retaining member is provided on an outer peripheral surface of one end of the atomizer, and an engaging groove is provided on an end surface of one end of the battery rod and is configured to accommodate one end of the atomizer, a side wall of the engaging groove is provided with a guide groove extending in a radial direction of the battery rod, a directing groove extending along a circumferential direction of the battery rod and in communication with the guide groove, and a retaining groove for accommodating the retaining member and extending from one end, away from the guide groove, of the directing groove towards the end surface of the battery rod, and a stopper is formed between the guide groove and the retaining groove to prevent the retaining member from moving towards the guide groove; and in assembling, the retaining member is inserted through the guide groove, and then is moved into the retaining groove along the directing groove.

Preferably, the electronic cigarette device further includes a force applying mechanism for applying a force on the atomizer in a direction away from the battery rod.

Preferably, the force applying mechanism includes a first magnet arranged at one end of the atomizer, and a second magnet arranged at one end of the battery rod; and the first magnet and the second magnet repel each other in a case that the atomizer and the battery rod are connected.

Preferably, the force applying mechanism includes an elastic second inner electrode configured to be electrically connected to the atomizer and a battery in the battery rod, and the second inner electrode is provided on a groove wall of the engaging groove and is configured to elastically abutting against an end surface of the atomizer.

Preferably, the second inner electrode includes an abutting member configured to abut against the end surface of the atomizer, a fastener movably connected to the abutting member, and a spring arranged inside the fastener and abutting against both the abutting member and the fastener, and the fastener is electrically connected to the abutting member and the battery.

Preferably, a second outer electrode is arranged outside the second inner electrode, and a second insulating sleeve is provided between the second outer electrode and the second inner electrode, the engaging groove is provided at one end of the second outer electrode, and the second outer electrode is configured to be electrically connected to the atomizer and another electrode of the battery.

Preferably, the guide groove and the stopper are provided on an inner wall of the second outer electrode, an end surface of the second insulating sleeve is provided with a gap at a position corresponding to the guide groove and the stopper, and a space enclosed by the gap and the stopper forms the directing groove and the retaining groove.

Preferably, the guide groove, the retaining groove and the stopper are all provided on an inner wall of the second outer electrode, a stopping step is formed on the inner wall of the second outer electrode, an end surface of the second insulating sleeve abuts against the stopping step, and a space enclosed by a portion, corresponding to the stopper, of the end surface of the second insulating sleeve and the stopper forms the directing groove.

Preferably, one end of the atomizer is provided with a first outer electrode, a first inner electrode, and a first insulating sleeve located between the first outer electrode and the first inner electrode, and the first outer electrode is arranged outside the first inner electrode, the first outer electrode and the first inner electrode are both electrically connected to an electric heating wire in the atomizer, and the retaining member is provided on an outer peripheral surface of the first outer electrode.

Preferably, there are at least two retaining members, which are located symmetrically at two sides of the first outer electrode, and the battery rod is provided with at least two guide grooves, two directing grooves, two retaining grooves and two stoppers corresponding to the retaining members.

Compared to the background, in the electronic cigarette device according to the present application, the side wall of the engaging groove is provided with the guide groove extending in the radial direction of the battery rod, the directing groove extending in the circumferential direction of the battery rod and in communication with the guide groove, and the retaining groove for accommodating the retaining member and extending from one end, away from the guide groove, of the directing groove towards the end surface of the battery rod; and the stopper is formed between the guide groove and the retaining groove to prevent the retaining member from moving towards the guide groove. When assembling the electronic cigarette, the retaining member of the atomizer may be inserted into the battery rod via the guide groove, then the atomizer is rotated to move the retaining member into the retaining groove along the directing groove, thus one end of the atomizer may be inserted into the engaging groove, in this way, a reliable connection between the atomizer and the battery rod is ensured, and the whole assembly structure of the electronic cigarette device is more stable and reliable. Furthermore, such structure is simple, easy to manufacture and facilitates connection.

BRIEF DESCRIPTION OF THE DRAWINGS

In order to more clearly illustrate the embodiments of the present application or the technical solution in the conventional technology, drawings referred to describe the embodiments or the conventional technology will be briefly described hereinafter. Apparently, the drawings in the following description are only several embodiments of the present application, and for those skilled in the art, other drawings may be obtained based on these drawings without any creative work.

DETAILED DESCRIPTION

An electronic cigarette device is provided according to the present application, and has a more stable and reliable assembly structure between a battery rod and an atomizer thereof.

For those skilled in the art to better understand technical solutions of the present application, the present application is described in detail in conjunction with drawings and embodiments hereinafter.

Figure 1:
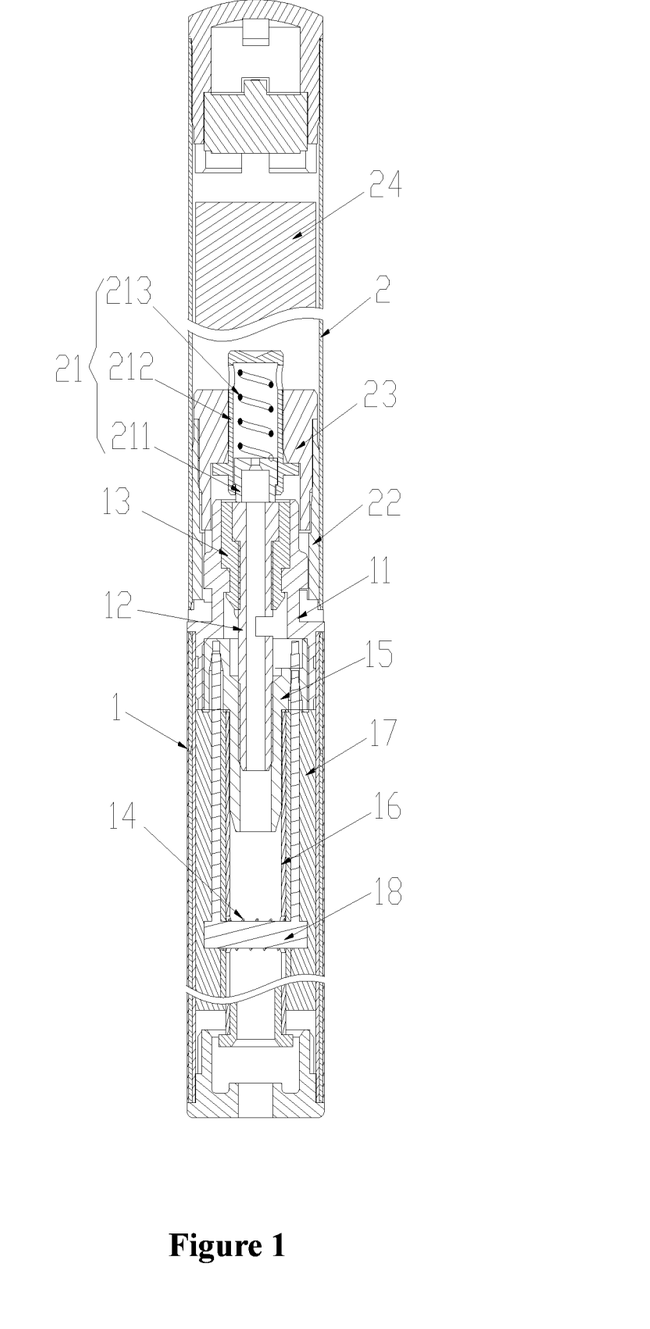
FIG. 1 is a sectional view of an assembly structure of an electronic cigarette device according to a first embodiment of the present application.
Figure 2:
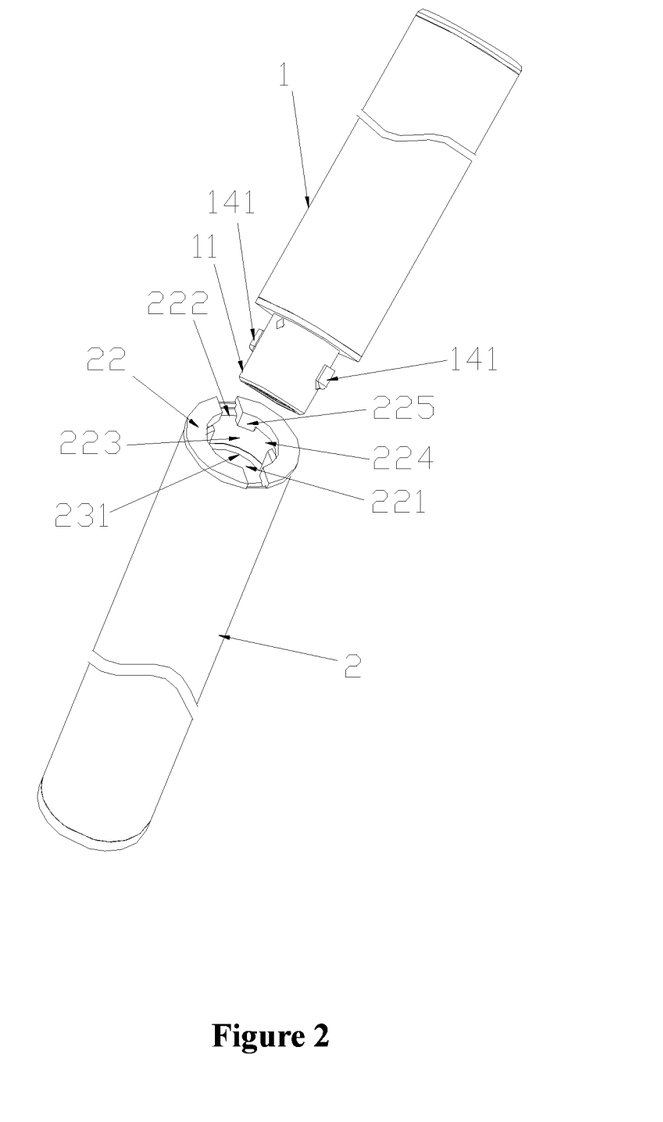
FIG. 2 is a schematic view showing the structure of the atomizer and the battery rod in FIG. 1 which are separated from one another.
Figure 3:
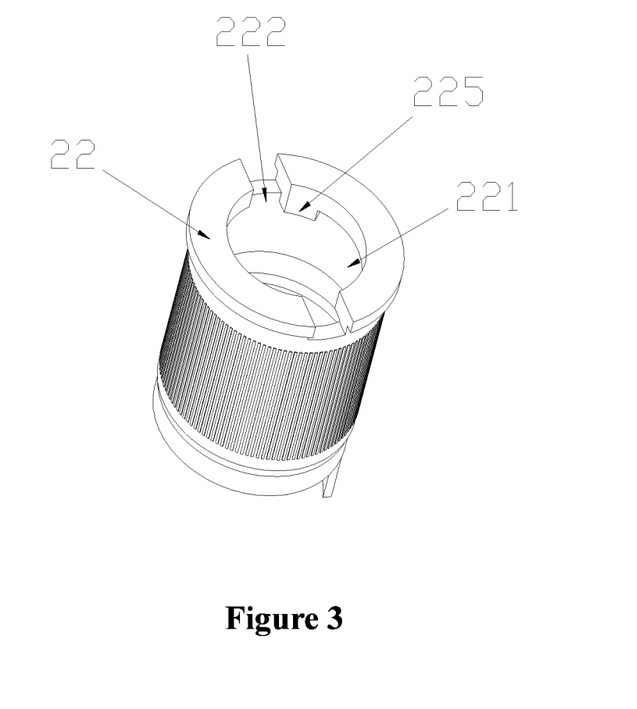
FIG. 3 is a schematic view showing the structure of a second outer electrode of the battery rod in FIG. 1.
Figure 4:
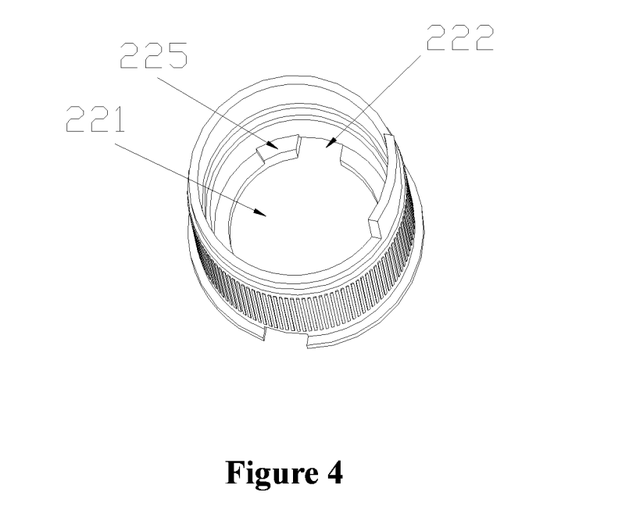
FIG. 4 is a schematic view showing the structure of the second outer electrode in FIG. 3 viewed from another angle.

Reference is made to FIGS. 1 to 4, wherein FIG. 1 is a sectional view of an assembly structure of an electronic cigarette device according to a first embodiment of the present application; FIG. 2 is a schematic view showing the structure of the atomizer and the battery rod in FIG. 1 which are separated from one another; FIG. 3 is a schematic view showing the structure of a second outer electrode of the battery rod in FIG. 1; and FIG. 4 is a schematic view showing the structure of the second outer electrode in FIG. 3 viewed from another angle.

In an embodiment, the electronic cigarette device according to the present application includes an atomizer 1 and a battery rod 2 which are configured to be connected. A retaining member 141 is provided on an outer peripheral surface of one end of the atomizer 1, and an engaging groove 221 is provided on an end surface of one end of the battery rod 2 and is configured to accommodate one end of the atomizer 1. A side wall of the engaging groove 221 is provided with a guide groove 222 extending in a radial direction of the battery rod 2, a directing groove 223 extending along a circumferential direction of the battery rod 2 and in communication with the guide groove 222, and a retaining groove 224 for accommodating the retaining member 141 and extending from one end, away from the guide groove 222, of the directing groove 223 towards the end surface of the battery rod 2. A stopper 225 is formed between the guide groove 222 and the retaining groove 224 to prevent the retaining member 141 from moving towards the guide groove 222.

One end of the atomizer 1 is provided with a first outer electrode 11, a first inner electrode 12, and a first insulating sleeve 13 located between the first outer electrode 11 and the first inner electrode 12, and the first outer electrode 11 is arranged outside the first inner electrode 12. The first outer electrode 11 and the first inner electrode 12 are both electrically connected to an electric heating wire 14 in the atomizer 1. The retaining member 141 is provided on an outer peripheral surface of the first outer electrode 11. Preferably, there are at least two retaining members 141, which are located symmetrically at two sides of the first outer electrode 11, thus the connection is more reliable. An atomizing seat 15, an air pipe 16 sleeved on one end of the atomizing seat 15, a liquid storage cotton 17 arranged outside the air tube 16, and a liquid guide cord 18, configured to convey liquid in the liquid storage cotton 17 to the electric heating wire 14 to be atomized, are provided inside the atomizer 1.

The electronic cigarette device further includes a force applying mechanism for applying a force on the atomizer 1 in a direction away from the battery rod 2. Due to the force applying mechanism, the connection between the atomizer 1 and the battery rod 2 is more stable, which may prevent the connection being loosen and prevent the atomizer 1 from being disengaged from the battery rod 2.

The force applying mechanism is an elastic second inner electrode 21 configured to be electrically connected to the atomizer 1 and a battery 24 in the battery rod 2. The second inner electrode 21 is provided on a groove wall of the engaging groove 221 and is configured to elastically abutting against an end surface of the atomizer 1.

The second inner electrode 21 includes an abutting member 211 configured to abut against the end surface of the atomizer 1, a fastener 212 movably connected to the abutting member 211, and a spring 213 arranged inside the fastener 212 and abutting against both the abutting member 211 and the fastener 212. The fastener 212 is electrically connected to the abutting member 211 and the battery 24. The abutting member 211 is configured to abut against an end surface of the first inner electrode 12, thus the electrical connection between the atomizer 1 and the battery rod 2 is more stable and reliable.

A second outer electrode 22 made of metal material is arranged outside the second inner electrode 21, and a second insulating sleeve 23 is provided between the second outer electrode 22 and the second inner electrode 21. The engaging groove 221 is provided at one end of the second outer electrode 22. The second outer electrode 22 is configured to be electrically connected to the atomizer 1 and another electrode of the battery 24. The second outer electrode 22 is configured to abut against the first outer electrode 11 of the atomizer 1 to realize the electrical connection therebetween.

The guide groove 222 and the stopper 225 are provided on an inner wall of the second outer electrode 22. An end surface of the second insulating sleeve 23 is provided with a gap 231 at a position corresponding to the guide groove 222 and the stopper 225, and a space enclosed by the gap 231 and the stopper 225 forms the directing groove 223 and the retaining groove 224. Preferably, the battery rod is provided with at least two guide grooves 222, two directing grooves 223, two retaining grooves 224 and two stoppers 225 corresponding to the retaining members 141. The second outer electrode 22 may be made of a conductive metal material such as copper, the second insulating sleeve 23 may be made of a non-metallic material such as silica gel or rubber, and the directing groove 223 and the retaining groove 224 are formed by the cooperation between the second outer electrode 22 and the second insulating sleeve 23, thereby reducing the material of the second outer electrode 22, reducing the cost and facilitating manufacture.

Figure 5:
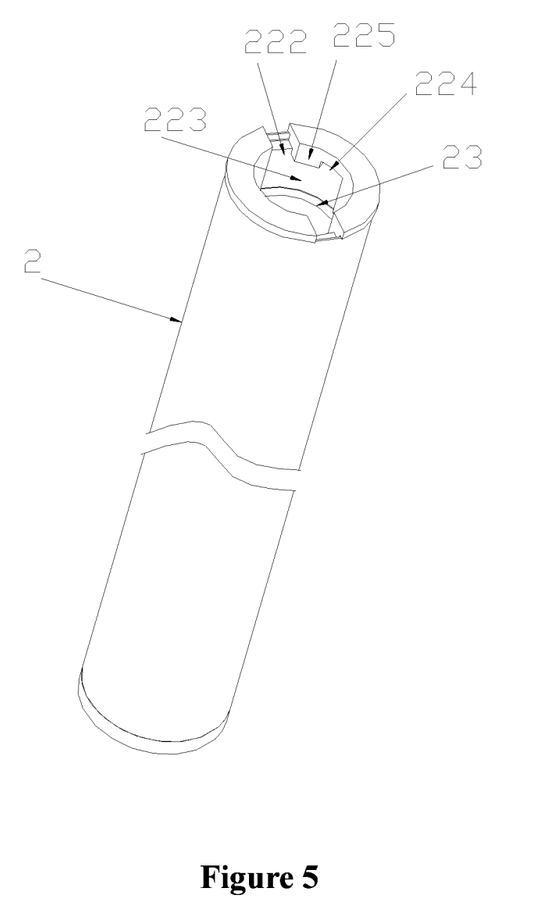
FIG. 5 is a schematic view showing the structure of the battery rod of the electronic cigarette device according to a second embodiment of the present application.
Figure 6:
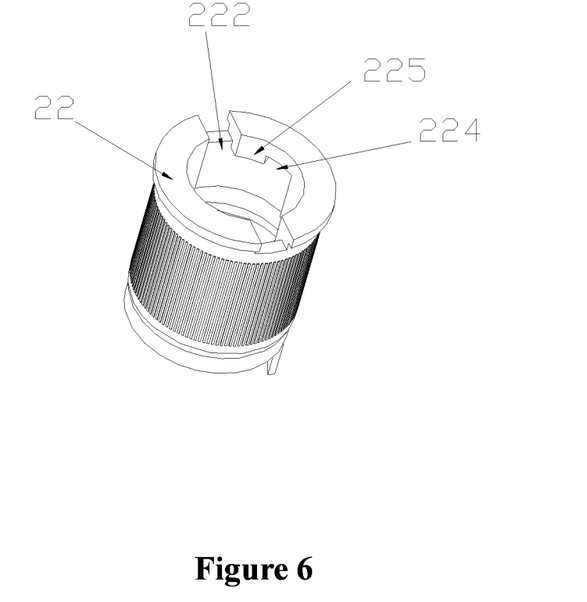
FIG. 6 is a schematic view showing the structure of a second outer electrode of the battery rod in FIG. 5.
Figure 7:
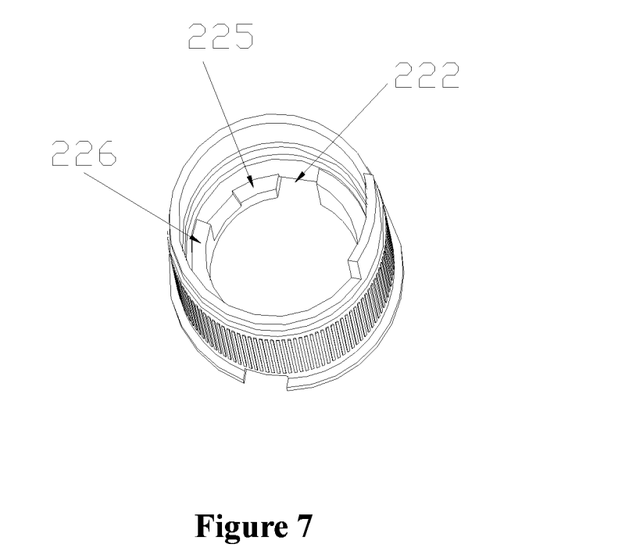
FIG. 7 is a schematic view showing the structure of the second outer electrode in FIG. 6 viewed from another angle.

Reference is made to FIGS. 5 to 7, wherein FIG. 5 is a schematic view showing the structure of the battery rod 2 of the electronic cigarette device according to a second embodiment of the present application; FIG. 6 is a schematic view showing the structure of a second outer electrode 22 of the battery rod 2 in FIG. 5; and FIG. 7 is a schematic view showing the structure of the second outer electrode 22 in FIG. 6 viewed from another angle. Unlike the first embodiment, in the second embodiment, the retaining groove 224 is provided on the inner wall of the second outer electrode 22, a stopping step 226 is formed on the inner wall of the second outer electrode 22, the end surface of the second insulating sleeve 23 abuts against the stopping step 226, and a space enclosed by a portion, corresponding to the stopper 225, of the end surface of the second insulating sleeve 23 and the stopper 225 forms the directing groove 223. Since the stopping step 226 is formed on the inner wall of the second outer electrode 22, there is no need to adjust the position when assembling, that is, it is only required to insert the second insulating sleeve 23 into the second outer electrode 22 until abutting against the stopping step 226, thus it is easy to assemble.

Figure 8:
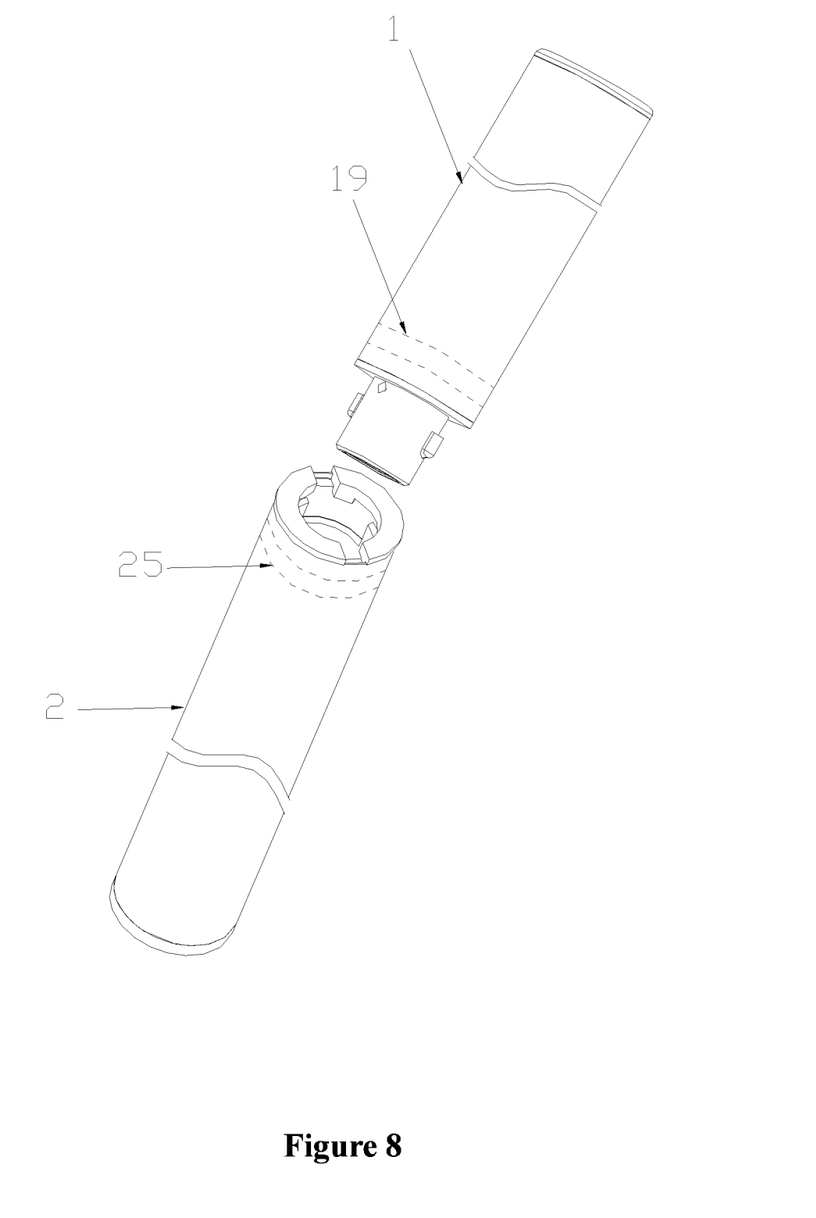
FIG. 8 is an exploded schematic view showing the structure of the electronic cigarette device according to a third embodiment of the present application.

Reference is made to FIG. 8, which is an exploded schematic view showing the structure of the electronic cigarette device according to a third embodiment of the present application. Unlike the first embodiment, in the third embodiment, the force applying mechanism includes a first magnet 19 arranged at one end of the atomizer 1, and a second magnet 25 arranged at one end of the battery rod 2. The spring 213 in the first embodiment is replaced by a silica gel member. The first magnet 19 and the second magnet 25 repel each other when the atomizer 1 and the battery rod 2 are connected, thus the retaining member 141 may be reliably clamped in the retaining groove 224. It is understood that, on basis of the first embodiment, the first magnet 19 and the second magnet 25 are respectively arranged on the atomizer 1 and the battery rod 2, thereby solving the defect that the spring 213 is prone to fatigue failure.

In summary, in the electronic cigarette device according to the present application, the side wall of the engaging groove 221 is provided with the guide groove 222 extending in the radial direction of the battery rod 2, the directing groove 223 extending in the circumferential direction of the battery rod 2 and in communication with the guide groove 222, and the retaining groove 224 for accommodating the retaining member 141 and extending from one end, away from the guide groove 222, of the directing groove 223 towards the end surface of the battery rod 2; and the stopper 225 is formed between the guide groove 222 and the retaining groove 224 to prevent the retaining member 141 from moving towards the guide groove 222. When assembling the electronic cigarette, the retaining member 141 of the atomizer 1 may be inserted into the battery rod 2 via the guide groove 222, then the atomizer 1 is rotated to move the retaining member 141 into the retaining groove 224 along the directing groove 223, thus one end of the atomizer 1 may be inserted into the engaging groove 221, in this way, a reliable connection between the atomizer 1 and the battery rod 2 is ensured, and the whole assembly structure of the electronic cigarette device is more stable and reliable. Furthermore, such structure is simple, easy to manufacture and facilitates connection.

The electronic cigarette device according to the present application is described in detail hereinbefore. The principle and the embodiments of the present application are illustrated herein by specific examples. The above description of examples is only intended to help the understanding of the method and the spirit of the present application. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. An electronic cigarette device, comprising an atomizer and a battery rod which are configured to be connected, wherein, a retaining member is provided on an outer peripheral surface of one end of the atomizer, and an engaging groove is provided on an end surface of one end of the battery rod and is configured to accommodate one end of the atomizer, a side wall of the engaging groove is provided with a guide groove extending in a radial direction of the battery rod, a directing groove extending along a circumferential direction of the battery rod and in communication with the guide groove, and a retaining groove for accommodating the retaining member and extending from one end, away from the guide groove, of the directing groove towards the end surface of the battery rod, and a stopper is formed between the guide groove and the retaining groove to prevent the retaining member from moving towards the guide groove; and in assembling, the retaining member is inserted through the guide groove, and then is moved into the retaining groove along the directing groove; and wherein, one end of the atomizer is provided with a first outer electrode, a first inner electrode, and a first insulating sleeve located between the first outer electrode and the first inner electrode, and the first outer electrode is arranged outside the first inner electrode, the first outer electrode and the first inner electrode are both electrically connected to an electric heating wire in the atomizer, and the retaining member is provided on an outer peripheral surface of the first outer electrode.

2. The electronic cigarette device according to claim 1, further comprising a force applying mechanism for applying a force on the atomizer in a direction away from the battery rod.

3. The electronic cigarette device according to claim 2, wherein the force applying mechanism comprises a first magnet arranged at one end of the atomizer, and a second magnet arranged at one end of the battery rod; and the first magnet and the second magnet repel each other in a case that the atomizer and the battery rod are connected.

4. The electronic cigarette device according to claim 2, wherein the force applying mechanism comprises an elastic second inner electrode configured to be electrically connected to the atomizer and a battery in the battery rod, and the second inner electrode is provided on a groove wall of the engaging groove and is configured to elastically abutting against an end surface of the atomizer.

5. The electronic cigarette device according to claim 4, wherein the second inner electrode comprises an abutting member configured to abut against the end surface of the atomizer, a fastener movably connected to the abutting member, and a spring arranged inside the fastener and abutting against both the abutting member and the fastener, and the fastener is electrically connected to the abutting member and the battery.

6. The electronic cigarette device according to claim 4, wherein a second outer electrode is arranged outside the second inner electrode, and a second insulating sleeve is provided between the second outer electrode and the second inner electrode, the engaging groove is provided at one end of the second outer electrode, and the second outer electrode is configured to be electrically connected to the atomizer and another electrode of the battery.

7. The electronic cigarette device according to claim 6, wherein the guide groove and the stopper are provided on an inner wall of the second outer electrode, an end surface of the second insulating sleeve is provided with a gap at a position corresponding to the guide groove and the stopper, and a space enclosed by the gap and the stopper forms the directing groove and the retaining groove.

8. The electronic cigarette according to claim 6, wherein the guide groove, the retaining groove and the stopper are all provided on an inner wall of the second outer electrode, a stopping step is formed on the inner wall of the second outer electrode, an end surface of the second insulating sleeve abuts against the stopping step, and a space enclosed by a portion, corresponding to the stopper, of the end surface of the second insulating sleeve and the stopper forms the directing groove.

9. The electronic cigarette device according to claim 1, wherein there are at least two retaining members, which are located symmetrically at two sides of the first outer electrode, and the battery rod is provided with at least two guide grooves, two directing grooves, two retaining grooves and two stoppers corresponding to the retaining members.

* * * * *